(12) United States Patent
Lowry

(10) Patent No.: X4874
(45) Date of Patent: Sep. 11, 1827

(54) LOCK, PERCUSSION, MAGAZINE

(76) Inventor: James B. Lowry

David H Mason & Matthias W Baldwin
Letters Patent

The Schedule referred to in these Letters Patent and making part of the same containing a description in the words of the said David H Mason & Matthias W Baldwin themselves of their improvement in making steel cylinders or mills as they are commonly called for the purpose of impressing figures or devices on copper rollers for calico printing: by biting in the figures or devices in the steel cylinders by means of acid the process which is usually called etching

---

The former method of making these mills was by punches with figures of rosets leaves. circles. pins, or other figures. The punches having on them the figure or device required, are driven into the steel cylinder or mill and the metal raised up by the punches is faced off and the parts united and trimmed with a graver. or the whole figure or device was cut in with a graver. — The improvement of the petitioners consists in etching the device on the mill, which we do in the following manner . A steel cylinder or mill is prepared of suitable size, with pivots or journals in the usual manner of making such mills. The mill is then coated with varnish or etching ground. such as is used by engravers for covering their plates in etching. The device is then traced thro the varnish or etching ground with an etching needle or steel point. the device being thus traced. the pivots or journals are coated with a varnish made with asphaltum and spirits of turpentine so as to prevent the acid from acting on the mill except where the device has been marked through the varnish with the etching needle or steel points. The mill is then immersed in a prepared acid. in making which we use the same kind of acid (via aqua fortis or nitrous acid) which is used for etching on copper but are careful not to have any copper in it. Our mode of preparing the acid is as follows. we dilute the acid in the proportions of four or five of spring water to one of acid; and then dissolve it in as much tin foil or block tin as it will take up, or until it ceases to effervesce while in this operation it must be in a bottle with the stopper out. this mixture is diluted in the proportion of from eight to fifteen of water to one of the acid used in the first instance according to the kind of work to be etched, for coarse work the prepared acid should be strong and for delicate work it should be weak This prepared acid is managed in all respects as nitrous acid is managed by Engravers on copper except that generally in the prepared acid there are no bubbles by its action on the steel.

This Process may be performed by any of the other preparations of acid used in biting soft steel, but that above described we have found to answer best. When the mill, or steel cylinder has been in the prepared acid a sufficient length of time to bite in the figure or device traced with the etching needle, or steel point, to the required depth (which is ascertained in the usual way by scraping off the varnish from a part of the device) it is taken out, the coating of varnish removed, and the figure or device is finished — with a graver in the usual manner of finishing etchings The mill is then hardened & a transfer taken from it to another steel cylinder or mill, so as that the figures or device etched in the first shall be raised on the second in order that it may be impressed on the copper cylinder to be used in calico printing, all which transfers are made in the usual manner &c. with the usual machinery for effecting such transfers of engravings.

What we claim as our invention or improvement is the etching of figures or devices on steel cylinders or mills to be transferred to copper rollers for calico printing. we claim nothing more.

In testimony that the above and foregoing is a true specification of our said improvement as herein before described, we have hereto set our hands and seals this twelfth day of October in the year of our Lord eighteen hundred & twenty seven David H. Mason
Matthias W. Baldwin Witnesses
Sabin Cotton
O. Cotton

[illegible]
[illegible] (796 [illegible]) (Patented 30 October 1827)

James B. Sowry a Citizen of U.S.
Letters Patent
Dated September 11th 1827.

(The Schedule referred to in these Letters Patent and making part of the same containing a description in the words of the said James B. Sowry himself of his improvement in the Magazine Percussion Gun Lock.

---

My Lock is composed of eight distinct parts exclusive of the screws & rivets, viz.

1st. The Break off Breech is made longer & may be made broader to suit the fancy of the Smith. There is but one hole or opening in the first mentioned piece, excepting one near that extremity of it which is farthest from the junction of the barrel with this break-off breech; and one passing through two downward projections of this piece through which a screw passes which serves as a pivot for the carrier or part next described; through the hole near the extremity of this piece a screw passes to connect it with the trigger plate hereafter described; but the hole first mentioned is for the upper extremity of the magazine to screw into and is bored or drilled as near the junction of the barrel with this piece as possible this is attached to the barrel as every other break off is in the common gun. On the lower surface of this piece a dove tail projection for the attachment of the main spring, similar to the projection for the same purpose in the common pistol lock.

2nd. The carrier or cock, for the sake of description I divide this into three parts. The first part is connected by its upper extremity in the manner above described, and passes down in a perpendicular direction when the gun is uncocked, and at right angles with the barrel & parallel with the magazine which is situated immediately before it or between it & the extremity of the barrel, it passes down as far as the trigger plate & as far as the lower extremity of the magazine & works constantly near the bottom of the magazine; from the point where it is connected with the break-off-breech there is a slight projection forming a cam similar to that in the common tumbler upon which the main spring rests & upon which it acts in driving the carrier upon the discharge of the Gun. 2ndly From the lower extremity of this first part there is a forward projection forming a segment of a circle, governed in its length by the size of the barrel; in all cases long enough to reach from the lower extremity of the part just mentioned to the cone or tube projecting below the barrel and through which the fire is communicated to the charge of the gun; this forward projection of the carrier must necessarily form a true segment of a circle: In the foremost extremity of this part of this second described piece, is a cavity or vacuum to contain the powder or priming let fall into it through
the slide of the magazine in the manner hereafter to be described, this cavity is about one eighth
of an inch in diameter, the priming held in this cavity is driven by the main spring against
the cone or tube just mentioned; I also sometimes affix a trigger with a shoulder on the
extremity of this second part of the carrier, which acts in the following manner, viz.
When the carrier is drawn back so as to cock the gun, the spring on the lower surface or
bottom of the trigger plate catches in a notch, which must always be made here when
the trigger is also placed here in the extremity of this forward projection of the carrier,
by pulling the trigger backwards the shoulder presses upon the spring, the end of which is
hitched in the notch above mentioned, releases its hold, and the carrier is driven by the
main spring against the cone, the percussion thus created discharges the gun. The third
part of the carrier is in the shape of a trigger & passes through the trigger plate & serves
as a lever to cock the gun.
3rd The main Spring is connected to the break-off breech in the manner above
mentioned, by means of a dovetail projection as in the pocket pistol, it rests & acts upon
the carrier as above described.
4th The Magazine is a cylinder of about half an inch in diameter, situated between
the carrier or cock and the breech extremity of the barrel, it is covered by a screw in its up-
per extremity or it may be done by a slide. – There is at the bottom of this fourth piece an
opening made for a false bottom or slide – about a quarter of an inch wide. The magazine
is here made larger than above & square – but the bore of the magazine is here contracted
& is not much larger than just to admit the passage of a common sized shot.
5th The slide or false bottom of the magazine is about a quarter of an inch in breadth,
or of a breadth sufficient to fill up completely the opening in the bottom of the magazine; in
this slide nearly in the middle is bored or drilled a hole a little smaller than the hole
in the bottom of the magazine; through this hole a grain of the fulminating powder or a
sufficient quantity of powder is passed, as will discharge the gun; but only one or two grains
of powder of the size of common bird shot can be taken from the magazine at once,
any more than is necessary to discharge the gun is prevented from being taken from
the magazine in the following manner, viz. When the slide is so situated that the hole
in its centre is directly under the hole in the bottom of the magazine, not more than
one or two grains can enter into it at a time, as the size of it is not so great as to admit
of any more at a time & the powder is prevented from passing entirely through the slide or false bottom by the bottom of the opening in the magazine above mentioned; - The slide is in the situation now spoken of when the gun is uncocked, of course only such a quantity of powder can be received in the slide as will fill the hole in its centre: but when the gun is cocked the slide is moved back until the hole in the slide is immediately over the hole in the bottom of the opening in the magazine, of course the bottom of the magazine itself is closed when the hole of the slide is over the hole in the opening of the bottom of the magazine, thus all communication is prevented or closed between the priming lodged in the foremost extremity of the carrier in the vacuum above described & thus all danger is prevented from an explosion of the magazine.

6th. The Trigger is situated just below the magazine and answers two intentions or objects - 1st. It performs the duty of the common gun triggers in discharging the gun and by means of a catch it serves as a seer, this catch is lodged in 7th. The Tumbler which is situated immediately in front of the trigger & a little above it. It has a notch in which the catch of the trigger is lodged when the gun is cocked. In cocking the gun the lower extremity of the carrier is drawn backwards & with it of course the forward projection, and the small projection in the farthest projection forward passes over and presses upon the tumbler which raises it up at which instant the catch in the trigger is lodged in the notch of the tumbler the powder at the same time is received in the forward extremity of the carrier & the gun is cocked, primed & ready for fire: when the magazine is full it always primes itself and there being no opening in the top excepting the one in the upper extremity of the magazine, which is covered by a screw or slide; from the peculiar construction of my lock it is impossible for the priming to get wet in the least degree by rain or any dampness of the atmosphere.

8th. The trigger plate, is about five inches in length: - there is an opening of sufficient length for the sweep made by the carrier in cocking the gun on the lower surface of this trigger plate is attached a spring to preserve the trigger in its place. When the trigger is situated on the forward projection of the carrier, the spring is placed in the front of the trigger plate and serves as a seer; but when the trigger is placed beneath the magazine the spring is attached to the side of the plate.

The slide or false bottom of the magazine may be drawn back either by a lever or a spring attached to the magazine or this may be effected by forming that part of the forw projection of the carrier round on the upper part of the carrier, which is situated just
of the forward projections of the carrier round on the upper part of the carrier which is situated just under the magazine, while that part
under the magazine, while that part which projects beyond this is left square;
thus when the carrier is drawn back the corners of the slide are caught by the square
portion on the extremity - the distance from the angle of the slide to the hole in its
centre is equal to the square left on the carrier just spoken of - when placed in the
stock every part of this lock is invisible excepting the trigger & a portion of the car-
rier also the upper surface of the break-off-breech & trigger plate.

Witnesses
E. H. W. Wharton
John B. Elliot

James B. Lowry.

Received & Recorded May 21st 1841 & Exd. W.G.
(1653 words)